United States Patent Office 3,222,294
Patented Dec. 7, 1965

3,222,294
CATALYST FOR BULK AND SOLUTION POLYMERIZATION
Heinz W. Meyer, Munich, Germany, assignor to Elektrochemische Werke Munchen A.G., Munich, Germany
No Drawing. Filed Dec. 21, 1962, Ser. No. 246,342
Claims priority, application Germany, Nov. 5, 1957, E 14,888; Aug. 25, 1958, E 16,350
3 Claims. (Cl. 252—428)

This application is a continuation-in-part of my application Serial No. 769,095, filed October 23, 1958, now abandoned, and this invention relates to catalysts suitable for the bulk and solution polymerization of unsaturated organic compounds.

It is known to use aqueous solutions of hydrogen peroxide for the suspension and emulsion polymerization of unsaturated polymerizable compounds such as vinyl derivatives, allyl derivatives, esters of maleic, fumaric, or itaconic acid, and many others. But such aqueous hydrogen peroxide solutions cannot be used for the bulk polymerization of said compounds because the water of such solutions would interfere with the reaction. For this reason, organic peroxides, in addition to other catalysts, have preferably been used for bulk polymerization. Anhydrous or almost anhydrous hydrogen peroxide would be an efficient catalyst for bulk polymerization; but it has not been used because it would be too difficult and dangerous to manipulate for this purpose. The same considerations apply to the solution polymerization in non-aqueous solvents.

It is a principal object of the invention to provide hydrogen peroxide in a concentrated harmless form suitable for the use as catalyst in bulk and solution polymerizations.

Other objects and advantages will be apparent from a consideration of the specification and claims.

I have found that solutions of high concentrated hydrogen peroxide in indifferent organic solvents are excellent polymerization catalysts for bulk and solution polymerizations, and can be handled without any risk.

Suitable indifferents solvents are liquids which have good solvent power for hydrogen peroxide but do not react therewith or have a decomposing effect on hydrogen peroxide; they must not interfere with the polymerization but may have a certain solubility for water, in case that not completely anhydrous hydrogen peroxide is used.

Suitable solvents which satisfy said conditions are esters of monohydric and polyhydric alcohols having not more than 4 carbon atoms, with aromatic monocarboxylic and polycarboxylic acids having up to 10 carbon atoms, phosphoric acid, and carbonic acid. Also such esters of ether alcohols having not more than 4 carbon atoms in uninterrupted chain may be used. Preferred ether alcohols are those of the general formula

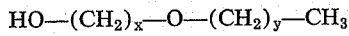

$$HO-(CH_2)_x-O-(CH_2)_y-CH_3$$

wherein $x=1-4$ and $y=0-3$.

Examples of such esters are dimethyl phthalate, dimethylglycol phthalate, diethyl phthalate, dibutyl phthalate, di-(beta-ethoxyethyl) phthalate, di(beta-butoxyethyl) phthalate, diethyl isophthalate, trimethyl phosphate, triethyl phosphate, tripropyl phosphate, tributyl phosphate, triisobutyl phosphate, tri-(beta-butoxyethyl) phosphate, tri-(betamethoxyethyl) phosphate, tri-(delta-ethoxybutyl) phosphate, tri-(gamma-ethoxypropyl) phosphate, mono- and di-lower alkyl phosphates, diethylcarbonate, ethylene carbonate, propylene carbonate, and mixtures of said esters.

Compared with conventional solvents which may have a certain solubility for hydrogen peroxide, such as ether, ethyl acetate, and others, the recited esters have the great advantage that, on the one hand, they combine excellent solubility for hydrogen peroxide with a certain solubility for small amounts of water, and that, on the other hand, they do not interfere with the polymerization; they are compatible with the formed polymers and do not affect their properties. Some alcohols and ketones, as well as aniline and quinoline are known to be good solvents for hydrogen peroxide. However, said solvents have a tendency to react violently or even explosively with hydrogen peroxide; the manipulation of such solutions is, therefore, still more difficult and even more dangerous than that of anhydrous hydrogen peroxide.

The hydrogen peroxide to be dissolved should have a concentration of at least 70 percent, preferably 85 percent by weight and more. Said hydrogen peroxide is dissolved in the solvent to form solutions of about 10 to 25 percent by weight of $H_2O_2$, which concentration may be increased, if desired, up to 50 percent.

The hydrogen peroxide solutions of the invention may be used as polymerization catalysts as such or they may contain, in addition, conventional organic peroxide catalysts in amounts of about 10 to 70 percent by weight, calculated on the solution. Such catalysts are, for instance, methylethylketone peroxide, cyclohexanone peroxide, butyl hydroperoxide, cumene hydroperoxide, hydroxyheptyl peroxide, dibenzaldiperoxide, di-tert. butylperoxide, tert. butylperbenzoate, 2-2- bis-(tert. butylperoxide)-butane, lauroylperoxide, and others.

For the use as catalysts, the organic hydrogen peroxide solutions are applied in amounts of about 0.1 to 5 percent by weight of the reactants to be polymerized. The rate of polymerization can be readily adjusted by suitable additions of the recited organic peroxides to the organic hydrogen peroxide solutions, and of promoters to the polymerization mixture.

The following examples are given to illustrate the invention.

In practically all examples, there was a development of heat on addition of the hydrogen peroxide to the solvent; the cause of the heat development is not yet quite understood but it was in all cases readily controlled by cooling.

EXAMPLE 1

25 parts of aqueous 80% hydrogen peroxide were slowly added, at room temperature with stirring and cooling, to 75 parts of triethyl phosphate. There was obtained a stable about 20 percent solution of hydrogen peroxide in triethyl phosphate which constituted an excellent polymerization catalyst for bulk and solution polymerization.

The same result was obtained when the triethyl phosphate was replaced by trimethyl phosphate.

EXAMPLE 2

24 parts of an aqueous hydrogen peroxide solution containing 84 percent of $H_2O_2$ were slowly added with stirring and cooling at room temperature to 76 parts of tripropyl phosphate. A stable solution of hydrogen peroxide in tripropyl phosphate was obtained which contained about 20 percent of $H_2O_2$.

EXAMPLE 3

11 parts of an aqueous hydrogen peroxide solution containing 90 percent of $H_2O_2$ were slowly added with stirring and cooling to 89 parts of tributyl phosphate. A stable solution of hydrogen peroxide in tributyl phosphate was obtained containing about 10% $H_2O_2$.

In the same way, a solution of hydrogen peroxide in triisobutyl phosphate was prepared.

EXAMPLE 4

23 parts of an aqueous hydrogen peroxide solution containing 87 percent of $H_2O_2$ were slowly added with stirring and cooling to 77 parts of tri-(beta butoxyethyl) phosphate. A solution containing about 20% $H_2O_2$ was obtained.

In the same way as described in Examples 1–4, Examples 5–18 were carried out, using the solvents and amount of solvent and hydrogen peroxide listed in the following tables.

*Table I*

| Example | Aqueous $H_2O_2$ solution | | Solvent parts | $H_2O_2$ concentration in obtained solution |
|---|---|---|---|---|
|  | Parts | Concentration |  |  |
| 5 | 15.6 | 96 | 84.4 | 15 |
| 6 | 22 | 90 | 78 | 20 |
| 7 | 25 | 80 | 75 | 20 |
| 8 | 23 | 87 | 77 | 20 |
| 9 | 11 | 91 | 89 | 10 |
| 10 | 21 | 95 | 79 | 20 |
| 11 | 10.5 | 95 | 89.5 | 10 |
| 12 | 22 | 90 | 78 | 20 |
| 13 | 27 | 93 | 73 | 25 |
| 14 | 10.3 | 97 | 89.7 | 10 |
| 15 | 17 | 90 | 83 | 15 |
| 16 | 25 | 80 | 75 | 20 |
| 17 | 15.6 | 96 | 84.4 | 15 |
| 18 | 25 | 80 | 75 | 20 |

*Table II*

SOLVENTS USED IN TABLE I

Example:     Solvent
- 5 — Tri-(delta-ethoxybutyl) phosphate.
- 6 — Tri-(gamma-ethoxypropyl) phosphate.
- 7 — Acid methylphosphate of commerce.*
- 8 — Acid ethylphosphate.
- 9 — Acid propylphosphate.
- 10 — Dimethyl phthalate.
- 11 — Diethyl phthalate.
- 12 — Di-(beta methoxyethyl) phthalate.
- 13 — Di-(beta ethoxyethyl) phthalate.
- 14 — Di-(beta butoxyethyl) phthalate.
- 15 — Diethyl carbonate.
- 16 — Ethylene carbonate (dioxolone-2).
- 17 — Proplyene carbonate (4-methyldioxolone-2).
- 18 — Tri-(beta-methoxyethyl)phosphate).

*The acid lower phosphates of commerce are mixtures of the mono and dialkyl phosphates.

EXAMPLE 19

1 part of a 40% solution of methylethyl ketone peroxide in dimethyl phthalate was added with stirring at room temperature to 1 part of the triethyl phosphate solution of hydrogen peroxide obtained according to Example 1. A homogeneous stable solution was obtained which was an excellent polymerization catalyst for bulk and solution polymerization.

Similar results were obtained when the 40% dimethyl phthalate solution of methylethyl ketone peroxide was replaced by a 50% solution of cyclohexanone peroxide in triethyl phosphate.

EXAMPLE 20

1 part of an 80% solution of tert. butyl hyperperoxide in triethyl phosphate was added to 3 parts of the hydrogen peroxide solution obtained according to Example 1.

EXAMPLE 21

1 part of a 70% solution of cumene hydroperoxide was added to 3 parts of the hydrogen peroxide solution obtained according to Example 12.

All the solutions obtained in the preceding examples are excellent polymerization catalysts for bulk and solution polymerization.

The following examples are given to show their application.

EXAMPLES 22–29

These examples were carried out on two different polymerization systems as follows:

Unsaturated polyester resin A:

4.4 moles of propanediol-1,2 were esterified after addition of 0.18 part of tri-(2-chloroethyl) phosphite and 0.005 part of hydroquinone (based on the weight of the batch) with two moles of maleic anhydride and 2 moles of tetrachlorophthalic anhydride, for a period of 6 hours at a temperature of 170–210° C.

70 parts of the obtained unsaturated polyester were mixed with 30 parts of vinyl toluene and 0.005 part of hydroquinone were added to the mixture. The thus obtained liquid unsaturated polyester resin had an acid number of 26.

Unsaturated polyester resin B:

4.2 moles of diethylene glycol (2,2'-dihydroxy-diethyl ether) are esterified for a period of 6 hours at a temperature of 160 to 220° C. with 2.6 moles of maleic anhydride and 1.3 moles of phthalic anhydride.

70 parts of the obtained unsaturated polyester were mixed with 30 parts of styrene, and 0.01 part of hydroquinone were added to the mixture. The thus obtained liquid unsaturated polyester resin had an acid number of 44.5.

Curing tests were made by mixing 50 g. of one of the unsaturated polyesters A or B with a hydrogen peroxide solution in a thin-walled beaker. The beaker containing the mixture was placed in a bath of constant temperature, and the time was measured after which gelation of the mass took place. At the same time, the temperature of the curing unsaturated polyester resin was measured by means of a thermocouple as a function of time, and the period of time was determined after which the temperature had risen to a maximum (peak time).

In the following Table III, the first column indicates the unsaturated polyester resin employed, and the second column the amount of the used $H_2O_2$ solution, calculated on the unsaturated polyester resin. The number behind "soln." designates the example according to which the solution had been prepared. The third column indicates the bath temperature. The fourth column indicates the time (in minutes) required for gelation, and the last column gives the time (in minutes) required to reach the peak of the exothermal temperature rise.

*Table III*

| Example No. | Resin | $H_2O_2$ solution | Bath temp., °C. | Gel time (min.) | Peak time (min.) |
|---|---|---|---|---|---|
| 22 | A | 1.5 percent soln. 1 | 60 | 7 | 48 |
| 23 | A | 1.5 percent soln. 2 | 60 | 7 | 47 |
| 24 | A | 1.5 percent soln. 3 | 60 | 8 | 52 |
| 25 | B | 1.5 percent soln. 18 | 60 | 6 | 45 |
| 26 | B | 0.75 percent soln. 1 | 100 | 8 | 14 |
| 27 | B | 0.75 percent soln. 2 | 100 | 8 | 14 |
| 28 | B | 1.5 percent soln. 3 | 100 | 9 | 15 |
| 29 | A | 0.75 percent soln. 4 | 100 | 9 | 16 |

EXAMPLE 30

2 parts of the hydrogen peroxide solution obtained in Example 10 were added to 100 parts of monostyrene, and the mixture was heated with thermostatic control at 80° C. The reaction was terminated after 8 hours; after cooling to room temperature, a colorless hard polymer was obtained.

EXAMPLE 31

To 100 parts of a solution of 75 parts of allylmelamine ester resin in 25 parts of monostyrene, available in commerce, there were added at room temperature 2 parts of the hydrogen peroxide solution of Example 12 and 1 part of a cobalt octoate solution in monostyrene, containing 1% of metal. After 13 minutes, the mass solidified to a solid gel. After 23 minutes, the polymerization reaction was practically terminated with reaching the temperature maximum.

I claim:

1. A catalyst composition suitable for block and solution polymerization consisting essentially of a solution of about 10 to 50 percent by weight of hydrogen peroxide in a substantially anhydrous ester of an acid selected from the group consisting of phosphoric acid, and carbonic acid, with a member of the group consisting of saturated aliphatic alcohols containing not more than 4 carbon atoms and ether alcohols of the formula $$HO-(CH_2)_x-O-(CH_2)_y-CH_3$$

wherein $x$ is an integral from 1 to 4 and $y$ an integral from 0 to 3.

2. A catalyst composition suitable for block and solution polymerization consisting essentially of a solution of about 10 to 25 percent by weight of hydrogen peroxide in a substantially anhydrous ester of an acid selected from the group consisting of phosphoric acid, and carbonic acid, with a member of the group consisting of saturated aliphatic alcohols containing not more than 4 carbon atoms and ether alcohols of the formula $$HO-(CH_2)_x-O-(CH_2)_y-CH_3$$

wherein $x$ is an integral from 1 to 4 and $y$ an integral from 0 to 3, and at least one organic peroxide catalyst, said organic peroxide catalyst being present in the amount of about 10 to 70 parts by weight of the entire catalyst composition.

3. A catalyst composition suitable for block and solution polymerization consisting essentially of a solution of about 10 to 50 percent by weight of hydrogen peroxide in a substantially anhydrous phthalic acid ester of an ether alcohol of the formula $$HO-(CH_2)_x-O-(CH_2)_y-CH_3$$

wherein $x$ is an integer from 1 to 4 and $y$ an integer from 0 to 3.

References Cited by the Examiner

UNITED STATES PATENTS

| 2,109,595 | 3/1938 | Marks | 252—428 |
| 2,565,783 | 8/1951 | Schouteden et al. | 252—428 |
| 3,004,927 | 10/1961 | Meyer | 252—426 |

OTHER REFERENCES

Bretschger et al.: "Transactions of the Electrochemical Society," vol. 92, 1947, pages 67–76.

German application D 17,076 Fenn et al., IVb/39B, Kl. 39b, Gr. 22/10, July 12, 1956, 2 pages spec., no dwg.

TOBIAS E. LEVOW, *Primary Examiner.*

SAMUEL H. BLECH, *Examiner.*